US005718027A

United States Patent [19]

Laumann

[11] Patent Number: 5,718,027

[45] Date of Patent: Feb. 17, 1998

[54] APPARATUS FOR INTERIOR PAINTING OF TUBING DURING CONTINUOUS FORMATION

[75] Inventor: Bruce E. Laumann, Crown Point, Ind.

[73] Assignee: Allied Tube & Conduit Corporation, Harvey, Ill.

[21] Appl. No.: 717,704

[22] Filed: Sep. 23, 1996

[51] Int. Cl.$^6$ .......... B23P 11/00; B05C 7/00

[52] U.S. Cl. .......... 29/33 D; 29/33 T; 118/306; 118/DIG. 10

[58] Field of Search .......... 29/33 D, 33 T, 29/460, 527.4; 118/DIG. 10, 317, 306; 427/424

[56] References Cited

U.S. PATENT DOCUMENTS

| | | | |
|---|---|---|---|
| 3,122,114 | 2/1964 | Kringel et al. | 113/33 |
| 3,226,817 | 1/1966 | Simborg et al. | 29/430 |
| 3,230,616 | 1/1966 | Krengel et al. | 29/200 |
| 3,256,592 | 6/1966 | Krengel et al. | 29/200 |
| 3,259,148 | 7/1966 | Krengel et al. | 138/145 |
| 3,559,280 | 2/1971 | Malihoit et al. | 29/527.4 |
| 3,561,096 | 2/1971 | Krengel et al. | 29/460 |
| 3,616,983 | 11/1971 | Kamimura et al. | 228/5 |
| 3,768,145 | 10/1973 | Ostrowski | 29/458 |
| 4,309,958 | 1/1982 | Jennings | 118/306 |
| 4,344,381 | 8/1982 | Ostrowski et al. | 118/626 |
| 4,352,838 | 10/1982 | Bostroem | 427/209 |
| 4,582,718 | 4/1986 | Escallon | 427/209 |
| 4,749,125 | 6/1988 | Escallon et al. | 239/5 |
| 4,771,523 | 9/1988 | Qureshi et al. | 29/33 D |
| 5,035,364 | 7/1991 | Escallon | 241/5 |
| 5,086,973 | 2/1992 | Escallon et al. | 239/3 |
| 5,165,604 | 11/1992 | Copp, Jr. | 239/106 |
| 5,279,863 | 1/1994 | Escallon | 427/477 |
| 5,356,665 | 10/1994 | Seki et al | 29/527.4 X |
| 5,364,661 | 11/1994 | Maitra et al. | 427/433 |
| 5,453,302 | 9/1995 | Chaudhry et al. | 427/430.1 |

FOREIGN PATENT DOCUMENTS

WO9300453 1/1993 WIPO.

OTHER PUBLICATIONS

08/287,856, 08/09/1994 Maitra et al.

*Primary Examiner*—William R. Briggs
*Attorney, Agent, or Firm*—Banner & Witcoff, Ltd

[57] ABSTRACT

An improvement is accomplished in apparatus for the continuous production of tubing from tubing stock, and like, elongated, closed structures from appropriate stocks. The apparatus includes welding means for continuously welding the tubing stock to form the tubing, with the welding occurring at a welding station. Downstream of the welding station are stations for the further processing of the tubing after welding, which generate conditions adverse to interior coatings. In apparatus as described, the improvement comprises several inventive features. A spray head provides for spraying of coating, and fits within the tubing. An elongated, flexible lance locates the spraying means downstream of the processing stations which generate adverse interior coating conditions, by introduction of the spray head into the tubing interior upstream of the welding station, and after introduction, movement of the spray head into the desired downstream position. The lance extends from the point of introduction to the properly located spraying means through the tubing. A coating supply lumen extends along the lance and supplies coating material under pressure to the spray head. Finally, a cooling jacket extends along the lance from the point of introduction to the spray head, and cools the supplied coating material to protect against high temperature damage. Because of the apparatus as described, environmentally friendly, waterbased paints and coatings may be successfully applied to the tubing interior. As most preferred, the lance, coating supply, and cooling jacket together take the form of three concentric layers of hose, with the coating material supplied through the innermost hose. The middle hose supplies cooling water, and the outer hose accomplishes water return.

3 Claims, 3 Drawing Sheets

APPARATUS FOR INTERIOR PAINTING OF TUBING DURING CONTINUOUS FORMATION

BACKGROUND OF THE INVENTION

This invention relates to continuous formation of tubing and the like, the tube mills in which tubing is continuously formed, and more particularly, to equipment and processes for the application of coatings to the interior of the tubing. More generally, this invention relates to interior coating of continuously moving, continuously formed, closed substrates, such as tubing, piping, conduit, or the like, of the types used for applications such as metal fencing and other mechanical and construction applications, fire protection piping and other piping applications, electrical conduit and other conduit applications, and similar applications. "Closed" is used to connote substrates which have circumferentially continuous structure about open interior spaces. "Interior coating" is used to connote application of one or more materials to all or any part of the open interior spaces of the closed substrates. Hereafter, "tubing" is used to connote tubing, piping, conduit and like closed substrates, all having cross-sectional configurations which are circular, square, rectangular and other cross-sectional shapes.

A variety of arts exist for the production from substrates of products such as tubing, piping, conduit, wire, bar and the like. Many processes are batch forming processes, while many others are continuous. In batch forming processes, discrete quantities of substrates are processed in series, while in continuous processes, products are processed from an endless substrate.

Particularly relevant, although not exclusively relevant, is the art of forming, welding and coating tubes and pipes. While this art is old, see U.S. Pat. No. 4,352,838 at column 1, lines 13–19, significant advances have been made by industry leaders. These advances include the advance of PCT Publication No. WO 93/00453 published Jan. 7, 1993, the advance of U.S. Pat. No. 5,364,661 issued Nov. 15, 1994, and the advance of U.S. patent application Ser. No. 08/287,856 filed Aug. 9, 1994. As reflected in these patents and this publication, galvanizing of continuous tubes and conduits has progressed to the point of rapid speeds of the tubes and conduits to be galvanized, on the order of six hundred feet per minute. Galvanizing has also progressed through the elimination of secondary or elevated zinc containers in favor of zinc pumped through cross-tees, spray nozzles and drip nozzles. Zinc application dwell times have been reduced to tenths of seconds, and contact zones to inches.

Industry leaders have also advanced the application of exterior non-metal coatings, as well, as shown in U.S. Pat. No. 5,453,302 issued Sep. 26, 1995. As in this patent, exterior protective coatings are applied by vacuum coating apparatus.

Applications of exterior coatings through alternate coating technologies have also been disclosed. As shown in U.S. Pat. Nos. 3,559,280 issued Feb. 2, 1971; 3,616,983 issued Nov. 2, 1971; 4,344,381 issued Aug. 17, 1982; and 5,279,863, issued Jan. 18, 1994; electrostatic coating has been considered one possibility. As disclosed in U.S. Pat. No. 3,559,280, electrostatic spray coating is accomplished after water spray, sizing, straightening, and drying, and in the multiple steps and locations of a spraying or coating section, a separate following baking or curing chamber, a separate following air blower and a separate following water spray. As disclosed in U.S. Pat. No. 3,616,983, electrostatic powder coating is accomplished as an alternative to other coating methods after earlier application of liquid coatings, and after heating applied by an external heater. As disclosed in U.S. Pat. No. 4,344,381, electrostatic spray coating is accomplished in an inert atmosphere by organic solvent-based, liquid coating materials.

In contrast with exterior coatings, advances in interior coatings have been less bountiful. Recent attention has been given to processes for reflowing interior zinc coatings to coat the seams which result from the welding by which the tubes are formed. However, except as noted, interior coatings such as paint are applied to continuously produced tubing in older procedures with older equipment. Typically, interior paint is applied by being sprayed within the tubing at the end of a lance. The lance is inserted in the tubing upstream of the welding of the tubing, and occurs immediately, i.e., within a few feet, downstream of the welding. U.S. Pat. No. 3,768,145 issued Oct. 30, 1973, teaches this procedure and associated equipment.

U.S. Pat. Nos. 3,122,114; 3,226,817; 3,230,615; 3,256,592; 3,259,148; 3,559,280; 3,561,096; 3,768,145; 4,344,381; 4,582,718; 4,749,125; 5,035,364; 5,086,973; 5,165,601; 5,279,863; 5,364,661; 5,453,302; and PCT Publication No. WO 93/00453 are incorporated by reference.

SUMMARY OF THE INVENTION

Despite the advances of the art, opportunity has remained for invention in applications of coatings to closed substrate interiors. In apparatus and processes like tube mills and continuous production of tubing, existing practices are adequate, but not fully desirable. Interior paints are applied to tubing immediately after closing of the stock from which the tubing is formed, upstream of significant later processing steps. As an example, paints are often applied upstream of the application of zinc coating to the tubing exterior, as in U.S. Pat. No. 3,768,145. Zinc coating stations present substantial barriers to the survival of high quality interior coatings past the zinc coating stations. Zinc is applied at temperatures at and above the melting temperature of zinc, in the range of 850° F. to 900° F. Tubing is typically preheated before entering zinc stations, by induction heaters, to the zinc application temperatures, and thus, the tubing interior reaches temperatures which are harmful to coatings on the interior. In the past, in recognition of abusive stages of tubing manufacturing processes such as the exterior zinc coating process, interior coatings have been selected and formulated with heat resistant components, as in U.S. Pat. No. 3,768,145. Unfortunately, the heat resistant components typically result in the coatings having high amounts of volatile organic compounds (VOC's). VOC's cause substantial environmental concerns which are now recognized, although they were not in years gone by.

In summary, therefore, in one aspect, the invention is an improvement in apparatus for the continuous production of tubing from tubing stock. As conventional, the direction of movement of the tubing during production defines a downstream direction, and the upstream direction is the opposite direction. The apparatus includes welding means for continuously welding the tubing stock to form the tubing, with the welding occurring at a welding station. Downstream of the welding station are stations for the further processing of the tubing after welding. These downstream processing stations generate conditions adverse to interior coatings. In apparatus as described, the invention comprises several means. A spraying means provides for spraying of coating, and fits within the tubing. A lance means locates the spraying means downstream of the processing stations which generate adverse interior coating conditions, by introduction of the spraying means into the tubing interior upstream of the welding station, and after introduction, movement of the spraying means into the desired downstream position. The lance means extends from the point of introduction to the properly located spraying means. A coating supply means extends along the lance means and supplies coating material under pressure to the spraying means. Finally, a cooling jacket means extends along the lance means from the point of introduction to the spraying means, and cools the supplied coating material to protect against high temperature damage. Because of the apparatus as described, environmentally friendly, waterbased paints and coatings, and paints and coatings not resistant to heat, may be successfully applied to the tubing interior.

As most preferred, the lance means, coating supply means, and cooling jacket means together take the form of three concentric layers of hose or tubing, with the coating material supplied through the innermost hose. The middle hose supplies cooling water, and the outer hose accomplishes water return. The innermost hose is wirebraid covered Teflon® hose, the middle hose is Nylon® or Teflon® hose, and the outer hose is stainless steel corrugated hose.

In additional embodiments, the invention comprises methods utilizing the apparatus of the invention; interior coated, closed substrates formed according to the methods and apparatus; and like aspects of the invention.

The full scope the invention, and its objects, aspects, and advantages will be fully understood by a complete reading of this specification in all its parts, without restriction of one part from another. Therefore, a detailed description of the preferred embodiments of the invention follows, and a drawing accompanies this specification.

BRIEF DESCRIPTION OF THE DRAWING

The preferred embodiments of the invention are hereafter described with reference to the accompanying drawing. The drawing consists of three figures, as follows.

DETAILED DESCRIPTION OF THE PREFERRED EMBODIMENTS

Figure 1:
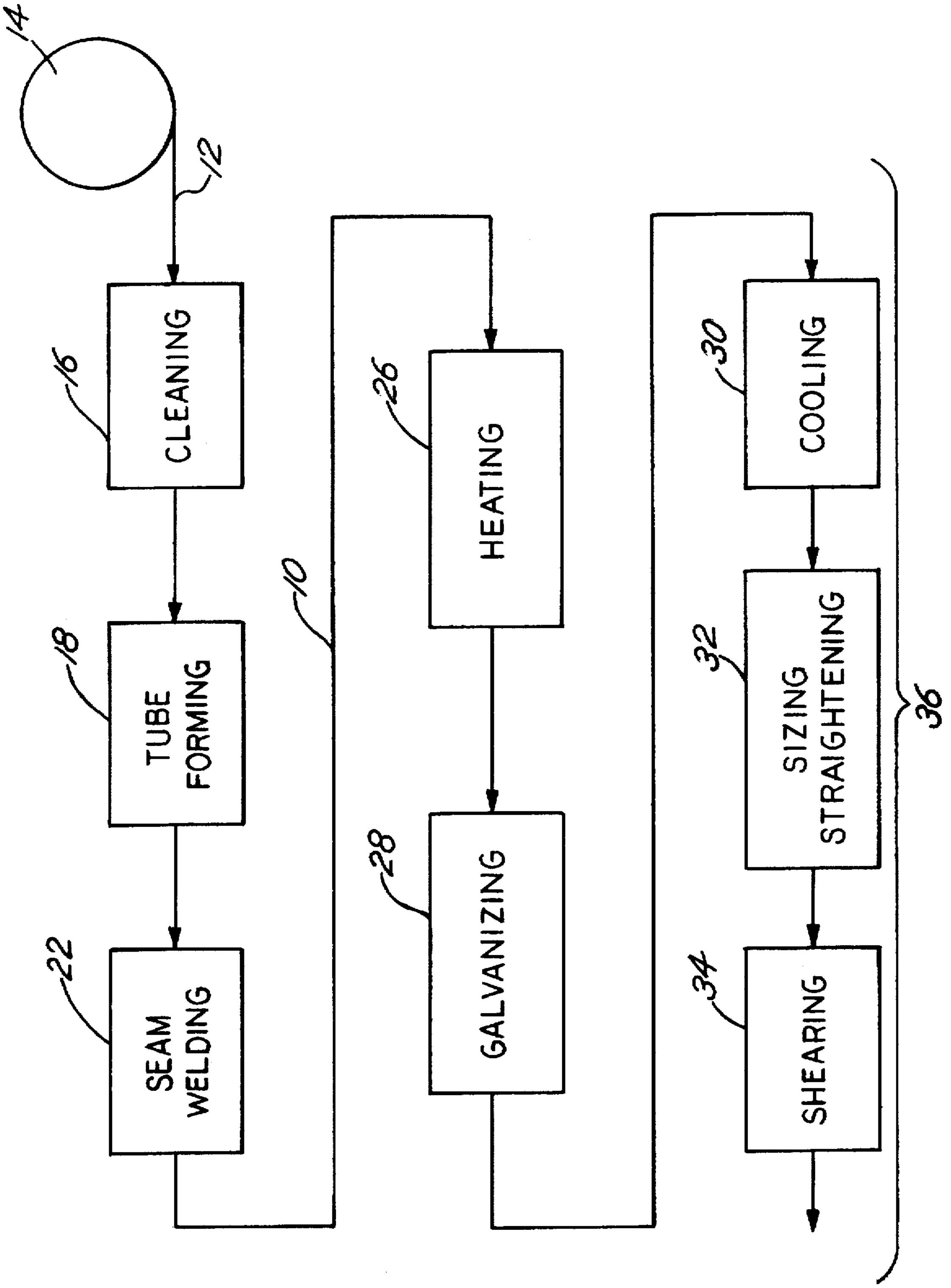
FIG. 1 is a schematic diagram of the process and equipment of practice of the preferred embodiment of the invention in a tube production mill.
Figure 2:
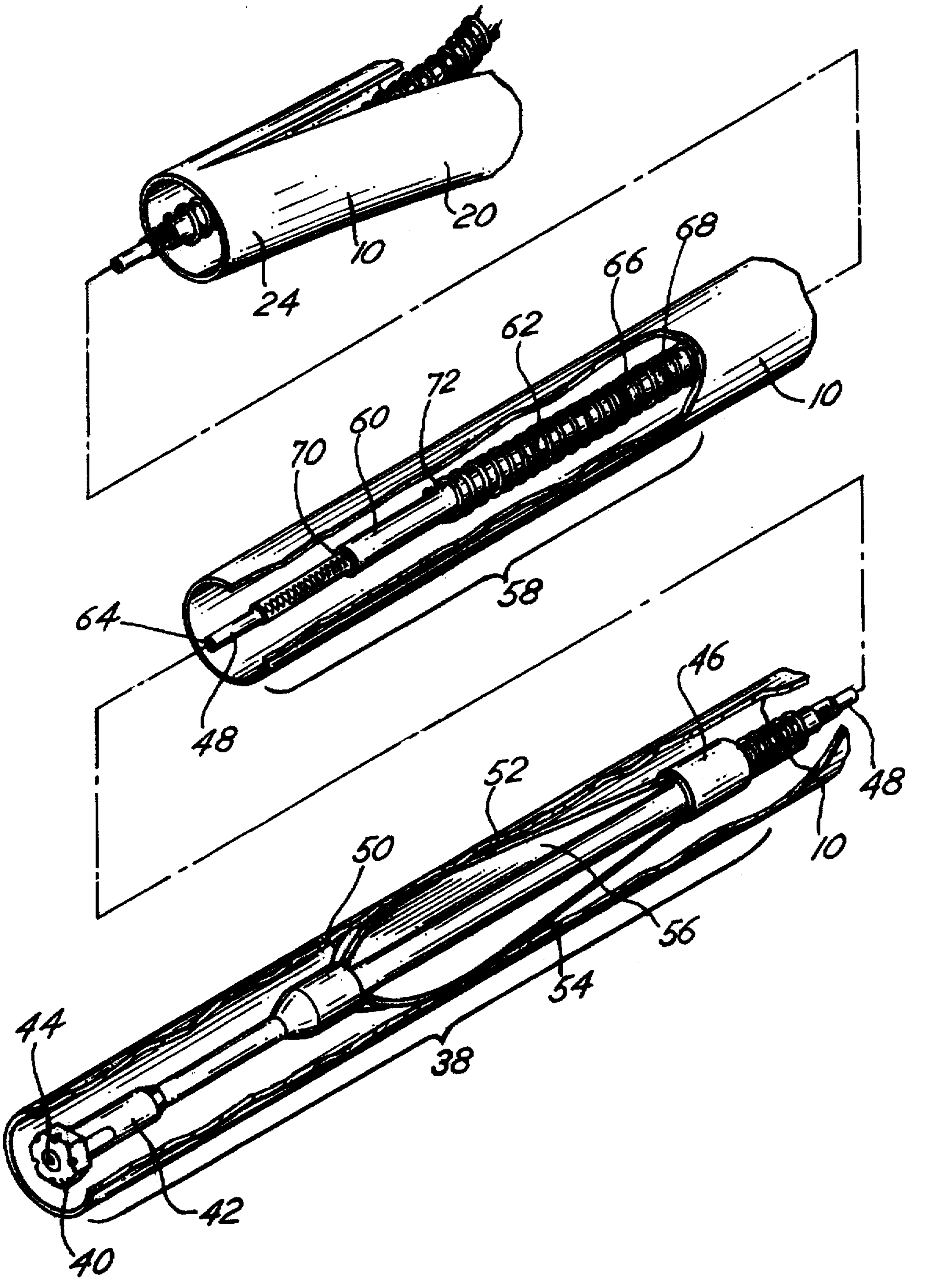
FIG. 2 is a perspective view of the specific apparatus of the preferred embodiment, shown in three related sections, from upstream of the tubing welding station, through stations such as the galvanizing station, and to the interior coating area, with the tubing and hoses of the invention broken away to reveal internal detail.

Preferred embodiments of the invention include and are practiced in a process and with equipment generally shown schematically as in FIG. 1 and FIG. 2. The closed substrate of the preferred embodiments is tubing 10 preferably formed from stock such as continuous metal strip 12. The strip 12 is uncoiled from typical supply rolls such as roll or coil 14, and cleaned in a cleaning station 16. The strip 12 is then moved through a series of tube forming rollers in a tube forming station 18, to bring the lateral edges of the strip together and form the strip into a substantially circular cross-section, as at the point of travel marked 20 in FIG. 2. When the lateral edges are adjacent to each other, they are welded, in-line, in a seam welding station 22, as known from past practices, and as shown diagramatically at point of travel 24 in FIG. 2.

The tubing 10 thus formed by the processes at the stations 18, 22 moves through a variety of additional processing steps and stations as desired. As shown by example in FIG. 1, the tubing 10 may move through a heating station 26 and galvanizing station 28, for zinc coating of the tubing exterior. The heating station 26 preheats the tubing 10 to approximately the temperature of molten zinc in the station 28, for efficiency of the station 28 and to promote alloy formation between the zinc and the tubing.

After leaving the station 28, the tubing 10 may be cooled, typically by water quenching, in a cooling station 30. After being sized and straightened in one or more stations such as station 32, the tubing 10 is cut into lengths suitable for shipping in a shearing station 34. Additional processing stations and steps, such as a station and step for application of an additional exterior coating, may be included as desired and appropriate to specific applications. The stations 26, 28, and 30, for galvanizing the tubing 10, may be included or excluded, as may other discretionary stations.

From the location of removal from supply rolls, to the location in which the tubing is cut into sections, the strip which forms the tubing and the resulting tubing proceed in a continuous line along a single, continuous central axis. The equipment stationed along this line, and the whole of the line and stations, constitute one production mill for production of the tubing. Thus, the axis of the tubing 10 defines a longitudinal direction along the direction of tubing movement, and transverse axes perpendicular to the longitudinal axis. Further, the direction of movement is toward the "downstream" or "rear" of the mill, and the direction opposite the direction of movement is "upstream" or to the "front" of the mill. Each station to the front of another station is upstream of that other station, and vice versa.

As shown and described, and as often used in actual practice, the mill is capable of a "line speed" of 500 to 600 and more feet per minute of production of tubing 10. The tubing may take the form of a 1.25 inch outer diameter, circular cross-section tubing, a 1.510 inch outer diameter circular cross-section tubing, circular cross-section tubing of additional diameters, square tubing of a variety of sizes, rectangular tubing of a variety of sizes, and tubing of a variety of other shapes and sizes.

In a mill as described, improvements according to the preferred embodiments of the invention provide for continuous, in-line painting of the interior of the tubing 10 with more common and often waterbased paints suitable for a variety of applications and not particularly formulated for high temperature tolerance.

Referring to FIG. 2, the preferred, improved apparatus includes a spray head 38. A spray nozzle 40 is located at the extreme downstream end 42 of the spray head 38. The nozzle 40 includes an outlet 44, for projection of paint or other coating materials inside the tubing 10. The nozzle 40 is removably screwed to the upstream end 42 of the spray head 38, for ease of replacement with nozzles of varied types, as desired.

The outlet 44 of the nozzle 40 is in open communication with an interior passage through the spray head 38 which extends back to the extreme upstream end 46 of the spray head 38. The interior passage is in turn in open communication with an internal passage in a hose 48, to be described.

Several spacers in the form of bowed wires 50, 52, 54 project laterally from the central body 56 of the spray head 38. As may be inferred from the drawing, the several spacers extend from the central body 56 a consistent distance to the interior wall of the tubing 10, to center the spray body and especially the nozzle 40 in the tubing 10. The spacers are formed of wear resistant material such as steel to resist wear against the tubing 10 as the tubing 10 moves rapidly past the spacers, due to the speed of production.

As also may be inferred, the spray head 38, and especially the nozzle 40, without particular regard to the details of the spray head 38 or nozzle 40, constitute one form of a variety of possible spraying means for spraying of coating inside the tubing 10. Coating material under pressure and exiting the outlet 44 of the nozzle 40 sprays in a circular pattern at the surrounding interior of the tubing 10, coating the interior.

Figure 3:
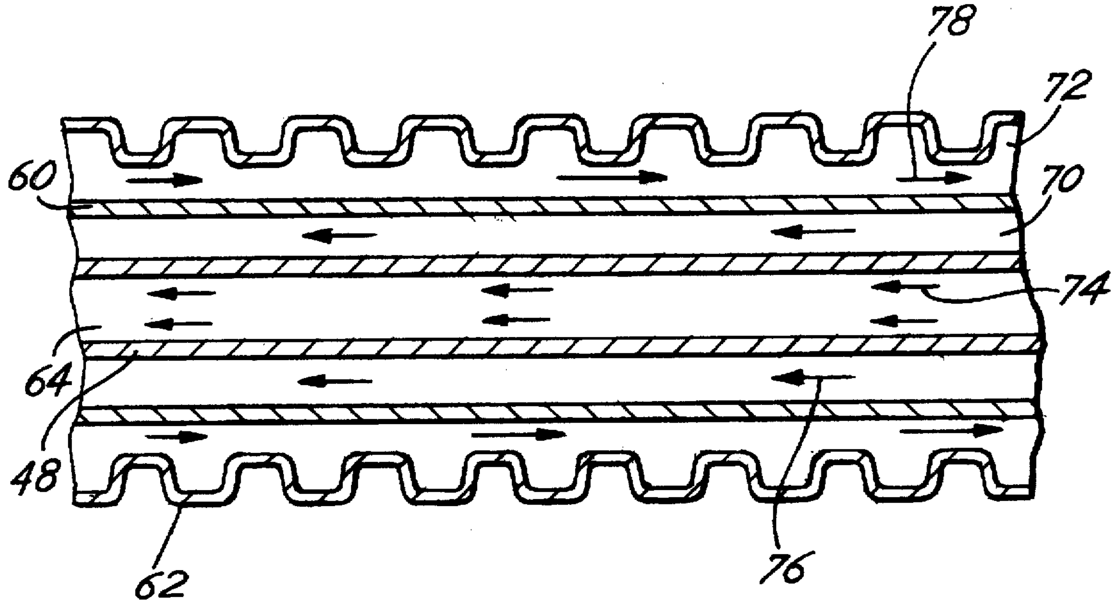
FIG. 3 is a cross-sectional view of a portion of the lance structure of the preferred embodiments.

Referring to the central portion of FIG. 2, and FIG. 3, the hose 48 by which coating material is supplied under pressure to the spray head 38 is one of three concentric hoses of a extended lance structure 58. The other concentric hoses are hose 60 and hose 62. Hose 48 has an inner or internal passage or lumen 64, and as described above, the passage 64 extends throughout the hose 58 and lance 58 to the spray head 38. The hose 48 is flexible, and formed of a Teflon® core wrapped in braided stainless steel wire. As most preferred, the hose is capable of withstanding 3000 pounds per square inch internal pressure, the dimension of the hose 48 is ¼ inch outer diameter, and the hose is obtained from Jackson Industries of Oak Park, Ill.

The hose 62, the outermost hose of the three hoses 48, 60, 62, is corrugated metal hose which has a radially outwardly extending, axially continuous spiral 66 and an interspaced, radially inwardly extending, axially continuous spiral 68. As most preferred, the inner diameter is approximately ⅜ inch and the outer diameter is approximately 0.570 inches. The hose 62 is obtained from Anamet Industries, Inc.

The intermediate or middle hose 60 may be Nylon® or Teflon® hydraulic/pneumatic hose as generally available, capable of withstanding over 350 psi internal pressure. The inner diameter is 0.270 inches, and the outer diameter is approximately ⅜ inch.

As evident from the interplay of the inner and outer diameters of the hoses 48, 60, 62, an annular internal passage 70 extends throughout the lance 58 between the exterior of the innermost hose 48 and the interior of the middle hose 60. A second annular internal passage 72 extends throughout the lance 58 between the exterior of the middle hose 60 and the interior of the external or outer hose 62. Referring to FIG. 3, the internal passage or lumen 64 of the innermost hose 48 carries pressurized paint to the spray head 38 as depicted by arrows such as arrow 74. The first annular internal passage 70 carries cooling liquid such as water from the back of the lance 58 along the lance 58 substantially completely to the area of the spray head 38, as depicted by arrows such as arrow 76. The second annular internal passage 72 carries the cooling liquid back from the area of the spray head 38 to the back of the lance 58, for recycling, as depicted by arrows such as arrow 78. The paint is pumped to the passage 64 from the back of the lance 58 outside the tubing 10 by pump apparatus, as will be explained. Cooling water is also pumped from an adjacent location. The paint is pumped at 700 psi; the water is pumped at 350 psi. For painting ½ inch electrical conduit, paint flow volume of approximately 0.64 pounds per minute is required, as is water flow volume of approximately ½ gallon per minute.

Referring again to FIGS. 1 and 2, the lance structure 58, with the hoses 48, 60, 62, is substantially elongated. In use, the lance 58 extends from back and upstream of the welding station 22 to in front and downstream of the galvanizing station 28, and also in front and downstream of any other discretionary "hostile" processing stations. In a typical mill having a galvanizing station 28 and no other downstream hostile processing stations, lance 58 is approximately 80 to 100 feet long, and most preferably 90 feet long. Depending on the mill and the presence or absence of numerous hostile processing stations, the lance 58 may be longer or shorter.

To introduce the lance 58 with the spray head 38 into proper location, the lance 58 is used to locate the spray head 38 in the tubing 10, upstream of the welding station 22, such as at location 20 in FIG. 2. As contemplated, the lance 58 is stored when not in use on a reel (not shown) above and behind the welding station 22. When put in use, the lance 58 is unreeled into the tubing 10, and it carries the spray head ahead of it as it moves into and downstream with the tubing 10 as the tubing 10 progresses. Assuming any hostile processing stations are functioning, to cause hostile conditions such as high temperatures, a water pump adjacent the reel or otherwise placed where convenient is activated, to pump water through the internal passages 70, 72 of the lance, even if paint is not present. The water protects the lance structure and especially the Nylon hose 60, which has a melting temperature of approximately 450° F.

The lance 58 is unreeled into the tubing 10, past the hostile processing stations. Care must be exercised in placement of the lance into the tubing 10, to avoid the sharp edges of the closing "V" of the tubing at the welding station. The sharp edges are capable of rapidly cutting the lance 58, which must be watertight. A guide may be desirable to prevent accidental cutting of the lance by causing the lance to be kept from the "V".

The lance may include markings along its its length, of its lengths to the markings, or include other indicators of the length to which the lance 58 is being extended into the tubing 10. Alternatively, the lance may be of a fixed length, or its unreeling automated to stop at a fixed position. Under all these alternatives, when the lance 58 is extended as desired, as for example, to place the spray head 38 in the area of the cooling station 30, the unreeling of the lance 58 is stopped, and supply of paint down the lance is begun. A paint pump adjacent the water pump or otherwise placed where convenient is activated, to pump the paint through the lance 58 to the spray head 38.

Operated as explained, the apparatus of the invention is capable of carrying paint without heat resistant components through the tubing and past hostile processing stations and processes, to a downstream location where there are no further downstream hostile processing stations or processes. Paint may be applied there, and thus, substantially any paint in terms of heat tolerance may be used to coat the interior of the tubing 10. As most preferred, the spray nozzle 40 can be located in the area of the cooling station after final hostile processing, as in the area of the cooling station 30, where the interior of the tubing has a temperature for safe, rapid drying of the paint to avoid running or poor coverage inspection of completed tubing may be used to adjust nozzle location, or knowledge of the temperature profile of the cooling station may also be used.

In the event of any obstruction as a result of any mistake of operation, the lance 58 may be reeled out of the tubing 10 and by mechanical cleaning or under high pressure air, cleared of obstruction.

If waterbased paints were used in past processes, which apply the paint upstream of galvanzing, the paints would be severely damaged by the heat of galvanization. Waterbased paints used with the described apparatus provide excellent interior coatings. Experience has taught that 85% of the VOC's of a tube mill which paints both tubing interiors and exteriors comes solely from interior paints, because of their formulation to survive hostile processing steps. With the invented apparatus and methods, substantially all VOC's can be eliminated.

The corrugated nature of the exterior hose or tubing 62 is considered important to proper functioning of the invention. The corrugations result in point contact of the lance structure along the tubing 10, and probably spiral movement of water in the passage 72, which appears to minimize heat transfer. Operating as described, the water returned through the hose 62 is typically no hotter than hot tap water and in many cases is only warm to touch. Also, stainless steel as the material of the hose 62, and the corrugations, minimize wear, conduction heat transfer, and electromagnetic induction heating.

With the lance structure 58 formed of all flexible materials, the lance structure may be reeled and unreeled from reels of about three feet in diameter, which is extremely convenient. In comparison, some past lances are rigid twenty-five foot linear lengths of unjacketed tubing, which require a twenty-five foot long linear storage rack.

As described, the lance structure 58 constitutes one possible form of a lance means which locates the spraying means downstream of the processing stations which generate adverse interior coating conditions, by introduction of the spraying means into the tubing interior upstream of the welding station, and after introduction, movement of the spraying means into the desired downstream position. As in FIG. 2, the lance means extends from the point of introduction to the properly located spraying means. As described, a coating supply means extends along the lance means and supplies coating material under pressure to the spraying means. Finally, a cooling jacket means extends along the lance means from the point of introduction to the spraying means, and cools the supplied coating material to protect against high temperature damage. Further, as shown, and as most preferred, the lance means, coating supply means, and cooling jacket means together take the form of the three concentric layers of hose or tubing 48, 60, 62, with the coating material supplied through the innermost hose 48. The middle hose 60 supplies cooling water, and the outer hose accomplishes water return. The innermost hose is wirebraid covered Teflon® hose, the middle hose is Nylon® hose, and the outer hose 62 is stainless steel corrugated hose.

In additional preferred embodiments, the invention comprises the methods described which utilize the apparatus of the invention; interior coated, closed substrates formed according to the methods and apparatus; and like aspects of the invention.

The preferred embodiments and the invention are now described in such full, clear, concise and exact language as to enable a person of ordinary skill in the art to make and use the invention. To particularly point out and distinctly claim the subject matter regarded as invention, the following claims conclude this specification.

We claim:

1. An improvement in apparatus for the continuous production of tubing from tubing stock, the direction of movement of the tubing during production defining a downstream direction, and the opposite direction being the upstream direction, wherein the apparatus includes welding means for continuously welding the tubing stock to form the tubing, with the welding occurring at a welding station, and downstream of the welding station, stations for the further processing of the tubing after welding which generate conditions adverse to interior coatings, the improvement comprising:

spraying means for spraying of coating, which fits within the tubing;

lance means attached to the spraying means for locating the spraying means downstream of the processing stations which generate adverse interior coating conditions, by introduction of the spraying means into the tubing interior upstream of the welding station, and after introduction, movement of the spraying means into the desired downstream position, the lance means extending from the point of introduction to the properly located spraying means;

coating supply means extending along the lance means for supplying coating material under pressure to the spraying means; and cooling jacket means extending along the lance means from the point of introduction to the spraying means, for cooling the supplied coating material and lance means to protect against high temperature damage.

2. The improvement of claim 1, the lance means, coating supply means, and cooling jacket means together comprising a first, central hose for passage of coating material, a second, concentric hose for passage of a cooling medium, and a third, concentric hose for return of cooling medium.

3. The improvement of claim 1, the first, second and third hoses being flexible.

* * * * *

UNITED STATES PATENT AND TRADEMARK OFFICE

CERTIFICATE OF CORRECTION

PATENT NO. : 5,718,027

DATED : February 17, 1998

INVENTOR(S) : Laumann

It is certified that error appears in the above-indentified patent and that said Letters Patent is hereby corrected as shown below:

Col. 6, ln. 57 reads "of the paint to avoid running or poor coverage inspection of" and should read --of the paint to avoid running or poor coverage. Inspection of--

Signed and Sealed this

Seventh Day of July, 1998

Attest:

Bruce Lehman

BRUCE LEHMAN

*Attesting Officer* *Commissioner of Patents and Trademarks*